Oct. 24, 1967  H. ZAHN  3,348,749
APPARATUS FOR THE RAPID INTERMITTENT
TRANSPORT OF PERFORATED FILM
Filed Sept. 20, 1965  5 Sheets-Sheet 3

Inventor:
Heinrich Zahn
by Michael S. Striker
Atty

Inventor:
Heinrich Zahn

United States Patent Office 3,348,749
Patented Oct. 24, 1967

3,348,749
APPARATUS FOR THE RAPID INTERMITTENT
TRANSPORT OF PERFORATED FILM
Heinrich Zahn, Rossdorf, near Darmstadt, Germany, assignor to Fernseh G.m.b.H., Darmstadt, Germany
Filed Sept. 20, 1965, Ser. No. 488,683
Claims priority, application Germany, Sept. 21, 1964,
F 44,024
8 Claims. (Cl. 226—59)

ABSTRACT OF THE DISCLOSURE

An arrangement for advancing rapidly perforated film through pneumatic acceleration forces. The arrangement is particularly applicable to kinematographic film which is advanced intermittently within approximately 1.2 milliseconds so that the pulldown takes place within the vertical blanking of the television signal. The film guide within the region of the upper film loop ahead of the film gate controls the individual phases of the pulldown. The film guide is shaped to effect the air pressure as a function of time, between film and guide, in the desired manner.

---

Figure 1:
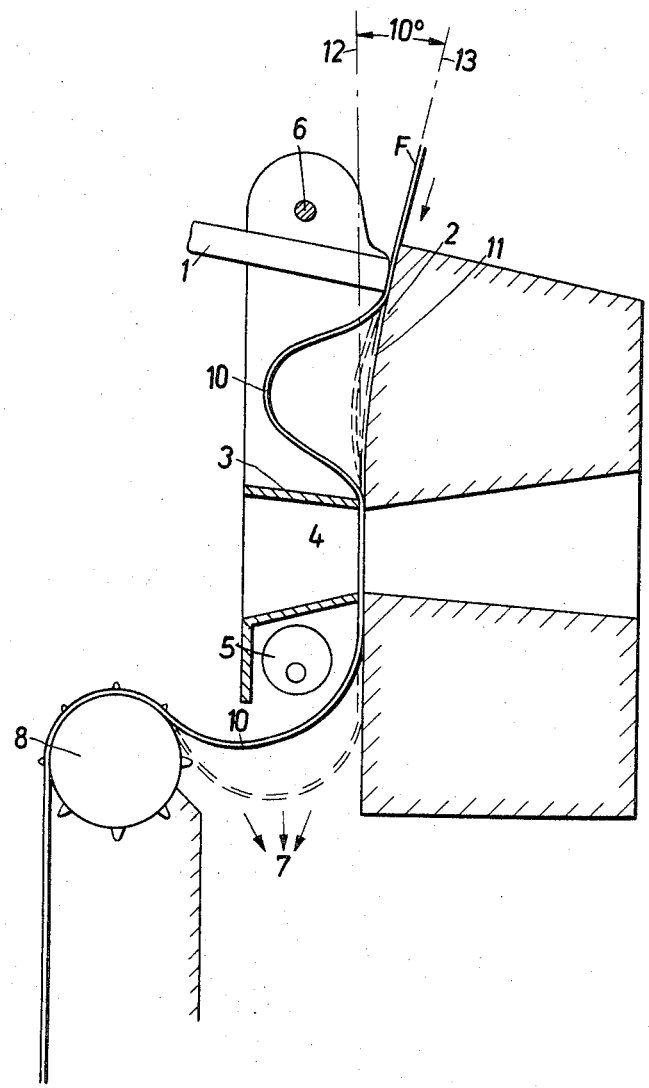

The invention relates to an appaartus for the rapid intermittent transport of perforated film, in particular of kinematographic film.

For special purposes, especially for recording pictures on kinematographic film or scannnig a kinematographic film in a film scanner, it would be very advantageous to effect the intermittent advance of the film within a time of not more than 1.2 milliseconds so that the pulldown takes place within vertical blanking of the television signal.

Numerous designs for the rapid pulldown of a film have been proposed, but up to now no satisfactory solution to this problem has been found. There are remarkable difficulties in producing the required pulldown of the film within the desired time of about 1.2 milliseconds, without damaging it or putting too great a strain upon it. In the designs which have been adopted in practice a considerable longer time is required for the pulldown.

A kinematographic apparatus in which pulldown of the film is effected pneumatically is already disclosed and claimed in co-pending application, Ser. No. 136,470, filed Sept. 7, 1961, now abandoned.

It is an object of the invention to provide an improved apparatus, wherein a perforated film is rapidly advanced by pneumatic acceleration forces.

The invention arises from the realization that, by a suitable configuration of the film guide within the region of the upper film loop ahead of the film gate it is possible to affect substantially the individual phases of the pulldown. Considering this it has been found that by a suitable configuration of the upper film loop which in turn depends on the shape of the film guide it is possible to affect the time function of the air pressure between film and guide during the pulldown period in such a manner that the escaping air has a far greater effect towards the end of the pulldown period, i.e. during deceleration of the film motion, than during the first part of the pulldown period, i.e. during acceleration.

According to the invention there is provided an apparatus in which within the region of the upper film loop, immediately ahead of the film gate, at the end of the pulldown period, the film is adapted to a guide of which the radius of curvature is so great that the tangent lines drawn to this guide at a distance of one frame form an angle of less than 7½°, respectively, that the tangent lines drawn to this guide at a distance of two frames form an angle of less than 15°. Thereby it is achieved that the air mass between the film and the curved guide offers only little resistance to the motion of the film during the first phase of the pulldown period, but has a relatively high decelerating effect during the last phase of the pulldown period, when deceleration of the film motion is desired.

With this special configuration of the film guide within the region above the film gate it is further achieved that the component effective in the direction of the vertical motion of the film in the gate and being a component of the force which is exerted by the air compressed between the film and the film guide is a multiple of this force.

Figure 2:
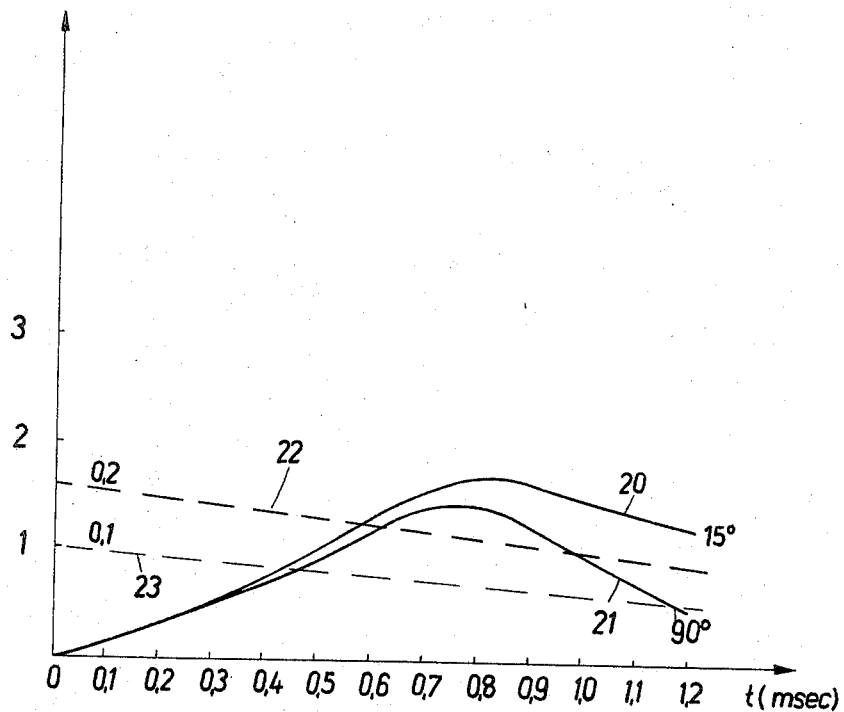
Figure 3:
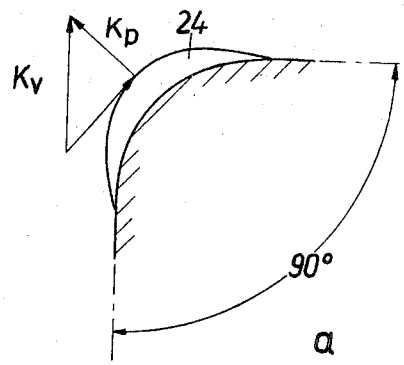
Figure 3:
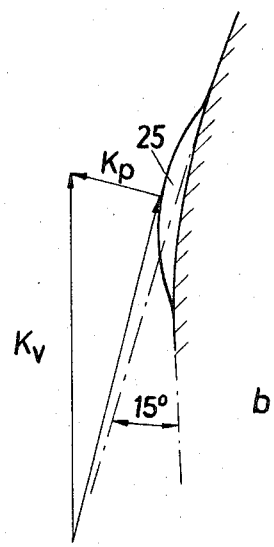
Figure 4:
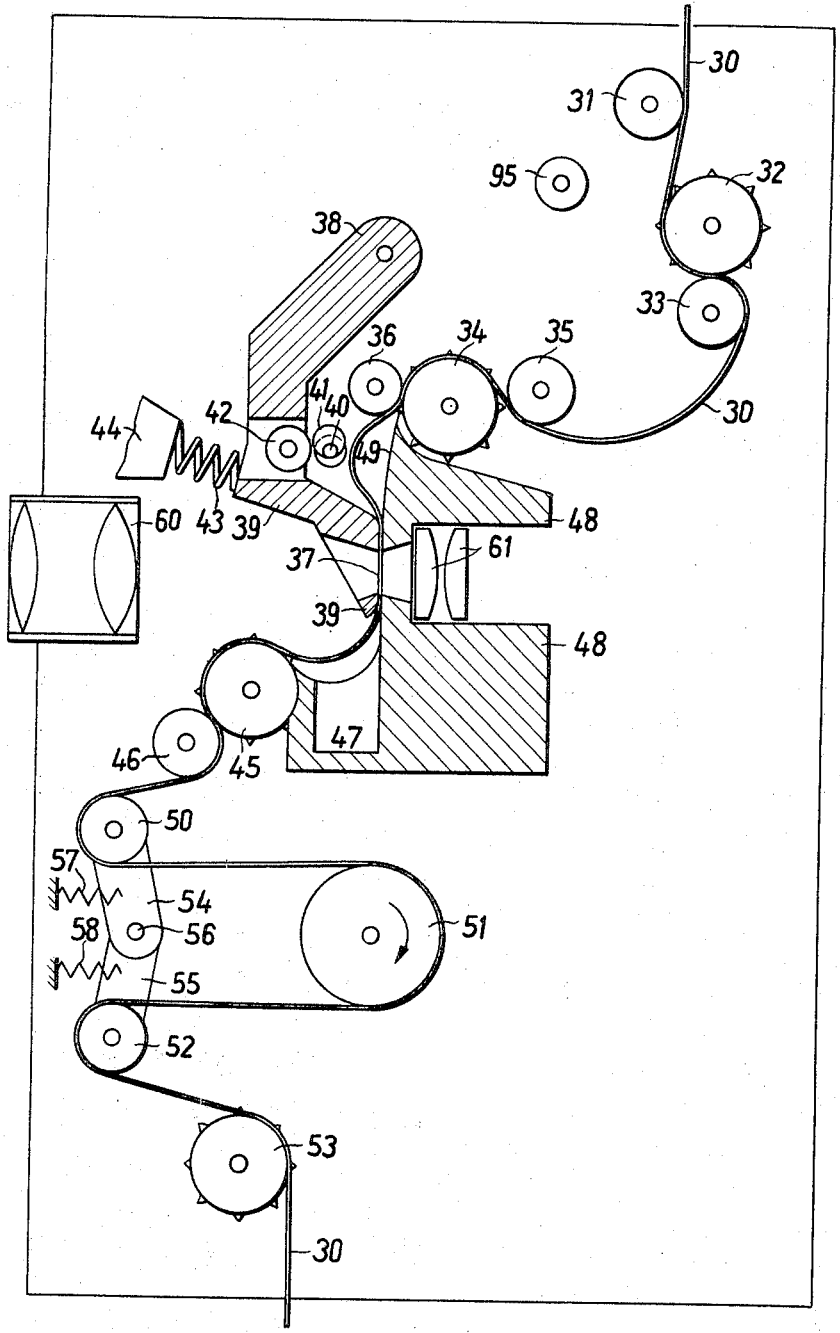
Figures 5, 5A:
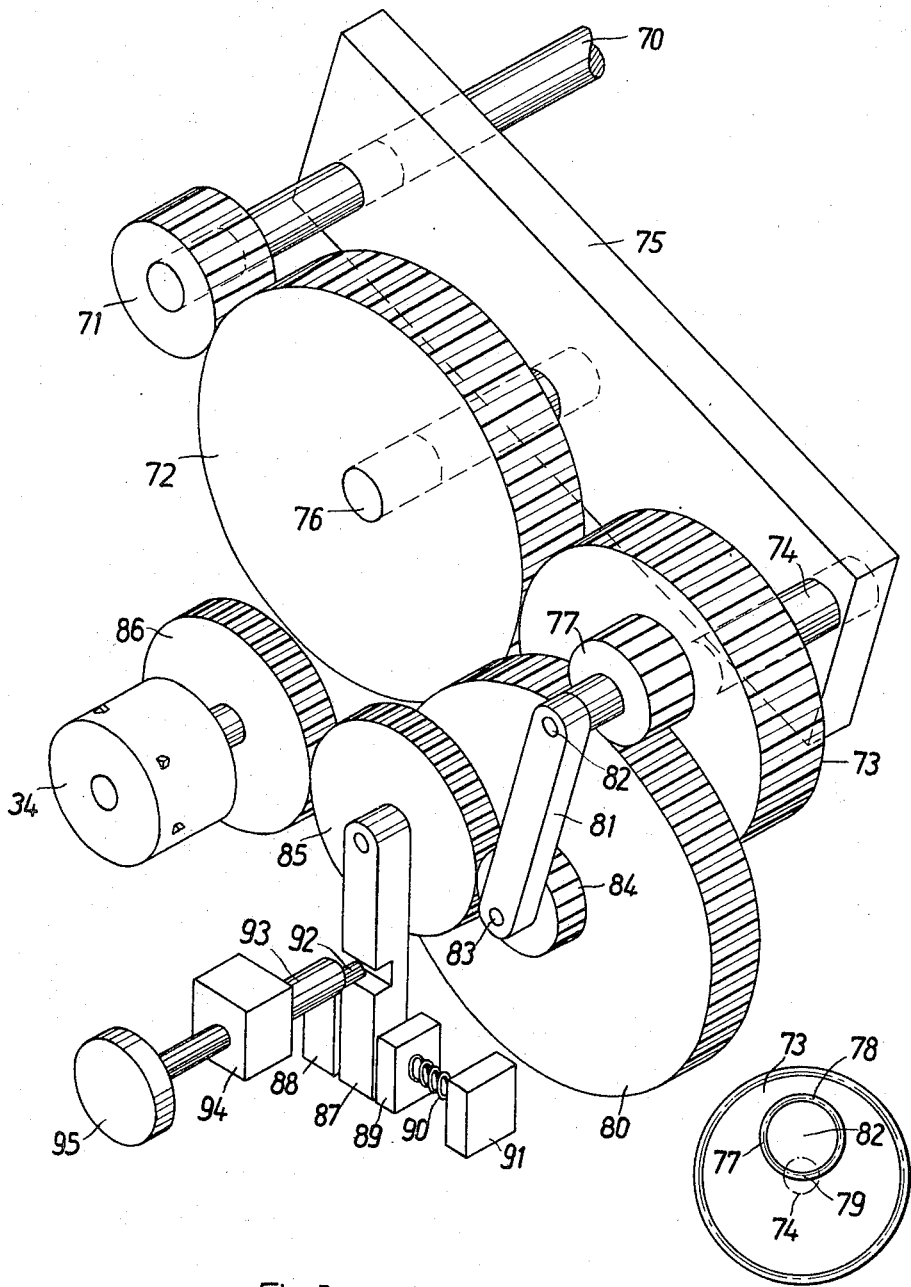

Further objects and advantages will become more apparent from the following description taken in conjunction with the figures, in which:

FIG. 1 is a view of the film guide means within the region of the film gate;
FIG. 2 is a diagram illustrating the effects of the dimensioning according to the invention;
FIG. 3 is a diagram of the forces effective within the region of the upper film loop;
FIG. 4 is a schematic view of an embodiment of the film transport mechanism according to the invention; and
FIG. 5 is a view of an embodiment of the driving means for the sprocket in the film transport mechanism as shown in FIG. 4.

An apparatus according to the invention is represented in FIG. 1 in somewhat simplified manner. The film F to be intermittently advanced in the direction of the arrow is fed into the apparatus by means not shown, e.g. a claw or a sprocket.

A clamping cheek 1 urges the film against a slightly curved guide 2 where the film is periodically clamped and released. Subsequent to clamping cheek 1, viewed in the direction of the transport of the film, there follows the region in which the film forms its upper loop. At the lower end of this region the film is clamped immediately above and below the film gate 4 by means of a clamping gate 3. By the rotation of the eccentric 5 the clamping gate 3 mounted for rotation in bearing point 6 is raised from the fixedly mounted film gate forming a single piece with film guide 2. Thereby it is possible that the suction in the low air pressure chamber 7 pulls the lower film loop rapidly downwards. A continuously rotating sprocket 8 transports the film from the lower loop to a sound device (not shown) after which the film leaves the apparatus.

The two positions of the film in the region of the upper loop are shown by solid lines between clamping cheek 1 and clamping gate 3. At the position designated by reference numeral 10 the length of the film loop of for example 35 mm. film is three times the height of a frame; at the position designated by the reference numeral 11 the length of the film loop is for example twice the height of a frame. The position of the film shortly before the pulldown is terminated is shown by broken line. The curvature of the guide within the region of the upper film loop, i.e. immediately above the film gate, is greatly effective upon the pulldown period which has to take place during a very short time, for example during 1.2 milliseconds.

Experiments have shown that a curvature of the guide which is not too flat is more favourable for the formation of the upper loop; on the other hand, if the guide becomes more and more flat, the air pressure between film loop and curved guide 2 will be much increased during the last phase of the pulldown period. In this case it is important that the decelerating effect of this air mass between the film and film guide is small at the beginning of the pulldown period, i.e. during the acceleration of the film, but is particularly great towards the end of the pulldown period, in order that the film motion is effectively decelerated.

In the embodiment shown the tangent lines 12 and 13 drawn in the longitudinal direction of the film to the guide at the upper and lower end of the film loop form an angle of 10°. This value has proved very favourable in practice. If the curvature of the film guide is greater, that is, if e.g. the tangent lines form an angle of 30°, the operation of the film transport would already be considerably impaired, that is, under the same conditions the time required for the pulldown including the time for smoothly stopping the film would be increased substantially. But it is important for many purposes, in particular for the recording or scanning of films for television purposes, that this time does not exceed 1.2 milliseconds.

The diagram shown in FIG. 2 serves to illustrate the conditions of air pressure between the film and the curved guide 2 (FIG. 1). The time from the beginning of the pulldown (zero) to the end of the pulldown (1.2 milliseconds) is plotted against the respective change in air mass compressed between the film and the guide 2.

The upper solid line 20 represents the respective change in air volume for an angle of 15° formed by the two tangent lines at the respective ends of the curved film guide. The lower solid line 21 represents the respective change in air volume for an angle of 90°. The upper broken line 22 represents the air volume that escapes through the perforation holes of the film at 0.2 atmospheric excess pressure. The lower broken line 23 represents the air volume that escapes through the perforation holes of the film at 0.1 atmospheric excess pressure. From this it may be seen that the pressure is far more effective during a longer period in a loop of which the tangent lines drawn to its ends form an angle of 15°. It is further to be seen that in the loop of which the tangent lines form an angle of 90° atmospheric excess pressure is lower than 0.1, during the last phase of the pulldown period.

FIG. 3 illustrates the forces in the loop immediately ahead of the film gate. The upper diagram (a) shows the conditions met when the angle between the tangent lines of the guide is 90°; the lower diagram (b) shows those when the tangent lines drawn to the guide form an angle of 15°. From the diagram (a) it may be seen that the vertical component $K_v$ effecting deceleration of the film and being a component of the force $K_p$ produced by the pressure in the loop 24 is $\sqrt{2}$ times the force $K_p$, whereas in the lower diagram (b) the vertical component is a multiple of this force. Since, as it is to be seen from FIG. 2, the pressure under the loop 25 is about four times greater than that under the loop 24, from FIGS. 2 and 3 it may be seen that under a loop 25 the decelerating force is more than ten times greater than under loop 24. Even more favourable conditions are met, if the film guide within the region of the upper film loop is curved in such a manner that the tangent lines (12, 13 in FIG. 1), as shown in the embodiment in FIG. 1, form an angle of not more than 10°.

FIG. 4 is a schematic representation of a film transport mechanism according to the invention. The film 30 is led from a feed spool (not shown) via the guide roller 31 to a sprocket 32, which rotates at constant velocity and advances the film at its average velocity. By means of a pressure roller 33 the film is kept on the sprocket in known manner. Then the film 30 arrives at a sprocket 34 which, in contrast to sprocket 32, rotates at non-uniform velocity. The pressure rollers 35 and 36 serve again to prevent the film from being lifted from the teeth of sprocket 34. During one frame change period the sprocket 34 is kept stationary for a short time. During the remainder of the frame change period the film is advanced by the height of a film frame, the acceleration and the subsequent deceleration of the film, from one point where the film is kept stationary to the other one, being preferably effected according to a sinusoidal function.

Between the sprocket 32 and 34 the film forms a loop to compensate for the different film speeds on the sprocket 32 and sprocket 34.

In the film gate 37 the film is clamped by a clamping gate 39, which may be swung about the axis 38, until it is raised by an eccentric 41 rotatably about the axis 40 by the pressure onto the roller 42 against the pressure of spring 43 which is fixed to a solid support 44. The loop above the film gate 37 is formed during the transport of the film by the sprocket 34 in that the film is clamped in the film gate 37 by means of the clamping gate 39.

Between the film gate 37 and the sprocket 45 with pressure rollers 46 rotating at uniform velocity the film forms a lower loop. Below this loop there is a suction chamber 47. This suction chamber is arranged in a component 48 which forms a unity with the film gate and the guide 49.

After sprocket 45 the film is led to a compensating roller 50, to the sound drum 51, to a second compensating roller 52. The compensating rollers 50 and 52 are mounted on levers 54 and 55 respectively swinging about the axis 56. The springs 57 and 58 force the film on the sound drum 51. The film is drawn out of the apparatus by sprocket 53 and is wound on by a take-up device (not shown).

On one side of the film gate 37 there is arranged a lens 60 and on the other side a condenser 61. If the apparatus is used for the projection of films, there is arranged on the right of the condenser a light source (not shown) to illuminate the film frame which is imaged on a projection screen by means of the lens 60. If the apparatus is used to transmit the film by television according to the flying spot principle, there is arranged on the left of the lens 60 a scanning tube (not shown). The raster traced on the screen of this tube is imaged on the film by means of the lens 60. In this case there is arranged on the right of the condenser 61 a photo cell which converts the light which is allowed to traverse the film into a television signal.

FIG. 5 is an embodiment of a gear for driving the intermittent sprocket rotating at non-uniform velocity by a shaft rotating at uniform velocity. On the driving shaft 70 rotating at uniform velocity there is mounted the spur wheel 71 which drives via the intermediate wheel 72 the spur wheel 73 rotating at frame frequency (1500 revolutions per minute for European standards or 1440 revolutions per minute for U.S. standards). Shaft 70 is arranged between fixed bearings (not shown), while shaft 74 of the spur wheel 73 is mounted on a lever 75 which may be swung about shaft 70. This swinging lever 75 has also mounted upon its shaft 76 the intermediate wheel 72.

There is rigidly connected to the wheel 73 a spur wheel 77 which is so mounted on the spur wheel 73 that its pitch circle 78 passes through the center 79 of the spur wheel 73 (FIG. 5a). The spur wheel 77 drives the spur wheel 80. The separation of the spur wheels 77 and 80 required for the correct engagement of the toothing is effected by a swinging lever 81 which carries the shaft 82 of the spur wheel 77 and the shaft 83 of the spur wheels 80 and 84. The spur wheel 84 is rigidly connected to the spur wheel 80 which is concentric to the spur wheel 84 and drives by way of the intermediate wheel 85 the spur wheel 86 which is rigidly connected to the sprocket 34 (see also FIG. 4). The spur wheel 85 is mounted on a part 87 which is arranged between the guiding cheeks 88, 89 for sliding in the direction perpendicular to the axis of spur wheel 85. In order that part 87 is not automatically misadjusted when under operation, the cheek 89 is pressed against part 87 by means of a spring 90 which is supported by the bracket 91 fixed to the case of the apparatus. An eccentric 92 mounted on a shaft arranged in a bracket 94 fixed to the case of the apparatus and rotatable by means of a knob 95 engages with a recess of part 87. Thus framing of the film in the film gate can be corrected.

The separation of the corresponding teeth surface measured on the circumference of the sprocket is advantageously somewhat greater than the separation of the perforation holes of the film. As, due to the shrinkage of the film, this sparation is as a rule somewhat smaller than the nominal value, the teeth surfaces may be spaced according to this value.

In this case, the pull of the film during rapid pulldown is taken up by the trailing edge of the first tooth of the sprocket engaging the film, viewed in the direction of the film transport, being pressed well against the edge of the perforation hole of the film, and the stress upon the perforation holes is reduced by the frictional forces between the film and the sprocket, to which the film is well adapted while being slightly extended.

The gear according to FIG. 5 effects the translation of a uniform rotation into a non-uniform rotation of the sprocket 34, so that, during a single frame change period, the sprocket is kept stationary for a short time and advances the film smoothly during the remainder of the period. When the spur wheel 73 is rotating, the spur wheel 77 rolls upon the spur wheel 80 being kept at the correct distance by means of the swinging lever 81.

Since the pitch circle 78 of the spur wheel 77 passes through the center 79 of the spur wheel 73 (FIG. 5a), the center 79 reaches the pitch circle of the spur wheel 80 during the rolling action. In this position the spur wheel 77 does only roll on the spur wheel 80 without the spur wheel 80 being moved. Spur wheel 80 and sprocket 34 are thus kept stationary. Subsequently spur wheel 80 starts to rotate at an accelerated speed, whereupon its speed of rotation decreases again and gets zero after a complete revolution of the spur wheel 73. As during this rolling process the distance/time diagram of the center 79 corresponds to an epicycloid of which the second derivative gives a sinusoidal function, the acceleration and deceleration of the spur wheel 80 and thus also of the sprocket 34 is effected according to a sinusoidal function.

Thus, during each frame change period, the film is gradually accelerated from the momentary standstill and gradually decelerated after the maximum speed has been attained after half a revolution of the spur wheel 73. Thus wear on the film, especially stress on the perforation holes, is kept low. At standstill the gear is self-locking, so that it cannot be misadjusted by the pull of the film acting upon the sprocket 34 during the pulldown period.

The center of the spur wheel 73 describes a circular arc during the rolling of the spur wheel 77 on the spur wheel 80. Thus the shaft 74 of the spur wheel 73 may be swung about the shaft 70 by means of the lever 75 and about the shaft 83 fixed to the case of the apparatus by means of the swinging lever 81.

The film transport mechanism described in FIG. 4 operates as follows: During each frame change period the sprocket 34 transports the film into a loop above the film gate 37. The film is clamped in the film gate by the clamping gate 39 by means of the spring 43. Below the film loop after the film gate there is a suction chamber 47. By the rotation of the eccentric 40 at frame frequency the clamping gate 39 is lifted from the film gate during each pulldown period, and the air pressure acting on the upper surface of the film loop pulls the film rapidly down out of the upper film loop by one frame height. The clamping gate 39 is lifted only during the time when the sprocket 34 is kept stationary. After clamping of the clamping gate 39 the rotation of the sprocket 34 starts again, and the sprocket 34 transports again the film into the upper loop by the exact height of a film frame.

What is claimed and desired to be secured by Letters Patent is:

1. Apparatus for the rapid intermittent transport of perforated film by pneumatic acceleration forces pulling down the film rapidly through a film gate, comprising, in combination, a mechanical clamping device for the film in the region of said film gate, said clamping device releasing the film at least during the pulldown time and clamping the film during the remainder of the frame change period, means for the non-uniform transport of the film, said transport means remaining stationary at least during the pulldown time and transporting the film by the height of a film frame during the remainder of the frame change period, so that the film forms periodically a loop ahead of said film gate, a curved film guide between said transport means and said film gate, to which the film is adapted during rapid pulldown, whereby the movement of the film is stopped and the registration of the film in said film gate is determined, the radius of curvature of said film guide being so great that the tangent lines drawn to said film guide at a distance of two frame heights form an angle of less than 15°.

2. Apparatus as defined in claim 1, wherein the radius of curvature of said film guide is so great that the angle between the tangent lines drawn to said film guide at a distance of two frame heights is 10°.

3. Apparatus as defined in claim 1, wherein said means for the non-uniform transport of the film consist of a sprocket remaining stationary during the pulldown time and transporting the film by one frame height during a single revolution first accelerating and then decelerating the film.

4. Apparatus as defined in claim 3, wherein the separation of the teeth surfaces of said sprocket is so much greater than the separation of the perforation holes of the film that during the pulldown time the trailing edge of the first tooth engaging in the film, viewed in the direction of film advance, is pressed well against the edge of the perforation hole.

5. Apparatus as defined in claim 3, comprising, in combination, a gear driving said sprocket by a shaft rotating at uniform speed by means of a first wheel mounted on a first swinging lever and rotating uniformly at frame frequency and being rigidly connected to a second wheel in such a manner that the pitch circle of said second wheel passes through the center of said first wheel, a third wheel mounted on a second swinging lever and engaging with said second wheel and driving said sprocket by means of a reduction gear.

6. Apparatus as defined in claim 5, comprising means for framing the film in the film gate by sliding a wheel of said reduction gear perpendicular to its axis.

7. Apparatus as defined in claim 6 for 16 mm. substandard film wherein the reduction gear has a transmission ratio of 8:1 and said sprocket has eight teeth equally spaced on its circumference.

8. Apparatus as defined in claim 6 for 35 mm. substandard film wherein the reduction gear has a transmission ratio of 4:1 and said sprocket has sixteen teeth equally spaced on its circumference.

References Cited

UNITED STATES PATENTS 2,560,919   7/1951   Bedford _____ 226—118 X

ALLEN N. KNOWLES, *Primary Examiner.*